US012232455B2

(12) United States Patent
Halonen (10) Patent No.: US 12,232,455 B2
(45) Date of Patent: Feb. 25, 2025

(54) ARRANGEMENT AND METHOD FOR MANAGING UNLOADING OF A LOAD OF A FORESTRY MACHINE

(71) Applicant: PONSSE OYJ, Vieremä (FI)

(72) Inventor: Marko Halonen, Lapinlahti (FI)

(73) Assignee: Ponsse Oyj, Vieremä (FI)

( * ) Notice: Subject to any disclaimer, the term of this patent is extended or adjusted under 35 U.S.C. 154(b) by 942 days.

(21) Appl. No.: 17/272,041

(22) PCT Filed: Aug. 29, 2019

(86) PCT No.: PCT/FI2019/050615
§ 371 (c)(1),
(2) Date: Feb. 26, 2021

(87) PCT Pub. No.: WO2020/043952
PCT Pub. Date: Mar. 5, 2020

(65) Prior Publication Data
US 2021/0345560 A1 Nov. 11, 2021

(30) Foreign Application Priority Data

Aug. 30, 2018 (FI) ..................................... 20185725

(51) Int. Cl.
*A01G 23/00* (2006.01)
*B60P 1/54* (2006.01)
(Continued)

(52) U.S. Cl.
CPC .......... *A01G 23/003* (2013.01); *B60P 1/5433* (2013.01); *B60P 3/41* (2013.01); *B66C 13/085* (2013.01); *B66C 1/585* (2013.01)

(58) Field of Classification Search
CPC ........ A01G 23/003; B60P 1/5433; B60P 3/41; B66C 13/085; B66C 1/585; F16P 3/142; F16P 3/141; F16P 3/147
(Continued)

(56) References Cited

U.S. PATENT DOCUMENTS

| 4,984,961 A * | 1/1991 | Herolf ................ A01G 23/006 144/256.1 |
| 6,360,166 B1 * | 3/2002 | Alster ..................... B60P 3/41 410/121 |

(Continued)

FOREIGN PATENT DOCUMENTS

| EP | 1 548 531 | 6/2005 |
| EP | 2 932 823 | 10/2015 |

(Continued)

OTHER PUBLICATIONS

International Search Report for PCT/FI2019/050615 dated Dec. 4, 2019, 5 pages.
(Continued)

*Primary Examiner* — Manglesh M Patel
(74) *Attorney, Agent, or Firm* — Nixon & Vanderhye PC (57) ABSTRACT

Off-road work machines (e.g., forestry machines) and unloading such machines are described. A forestry machine includes a load space for a timber load, a boom structure, and a wood-handling tool attached to the boom structure. The method includes defining and noting down the location of the timber pile, calculating and noting down the location of the edge of the timber pile, picking a timber bundle from the timber load by the wood-handling tool, calculating the distance of the end justified on a load screen of the edge of the timber bundle from the wood-handling tool, calculating an unloading location for the timber bundle in the defined location of the timber pile, and controlling and unloading the timber bundle into the timber pile in the calculated unloading location such that one edge of the timber pile becomes even and straight.

15 Claims, 11 Drawing Sheets

(51) Int. Cl.
  *B60P 3/41* (2006.01)
  *B66C 1/58* (2006.01)
  *B66C 13/08* (2006.01)

(58) Field of Classification Search
  USPC .......................................................... 701/50
  See application file for complete search history.

(56) References Cited

U.S. PATENT DOCUMENTS

| | | | | |
|---|---|---|---|---|
| 2005/0066641 | A1* | 3/2005 | Huhmarkangas | B60P 7/135 56/1 |
| 2005/0111962 | A1* | 5/2005 | Whitehead | B65D 90/006 414/800 |
| 2007/0297891 | A1* | 12/2007 | Whitehead | B65D 61/00 414/800 |
| 2009/0229708 | A1* | 9/2009 | Quigg | A01G 23/003 144/4.1 |
| 2012/0323453 | A1* | 12/2012 | Havimaki | G07C 5/085 701/50 |
| 2013/0170941 | A1* | 7/2013 | Drott | B65D 88/129 211/49.1 |
| 2013/0292190 | A1* | 11/2013 | Havimaki | A01G 23/00 177/1 |
| 2014/0012538 | A1* | 1/2014 | Kaye | G01B 7/042 702/158 |
| 2015/0151952 | A1* | 6/2015 | Kivi | B60W 30/04 701/50 |
| 2015/0353328 | A1* | 12/2015 | Palmroth | B66C 13/18 701/50 |
| 2016/0054739 | A1* | 2/2016 | Palmroth | E02F 3/4135 701/50 |
| 2016/0250959 | A1* | 9/2016 | Blanchard | B60P 7/14 414/549 |
| 2017/0089032 | A1 | 3/2017 | Hokkanen et al. | |
| 2018/0194266 | A1* | 7/2018 | Käppi | A01G 23/00 |
| 2019/0373826 | A1* | 12/2019 | Tossavainen | A01G 23/006 |
| 2020/0094892 | A1* | 3/2020 | Hukkanen | B62D 55/065 |

FOREIGN PATENT DOCUMENTS

| | | |
|---|---|---|
| EP | 2 939 529 | 11/2015 |
| EP | 2 939 530 | 11/2015 |
| EP | 2 987 399 | 2/2016 |
| EP | 3 349 141 | 7/2018 |
| FI | 7189 | 8/2006 |
| FI | 20145397 | 10/2015 |
| WO | 89/00808 | 2/1989 |
| WO | 2004/020938 | 3/2004 |
| WO | 2014/195585 | 12/2014 |
| WO | 2018/130747 | 7/2018 |

OTHER PUBLICATIONS

Written Opinion of the ISA for PCT/FI2019/050615 dated Dec. 4, 2019, 8 pages.
Löfgren, "Kinematic Control of Redundant Knuckle Booms with Automatic Path-Following Functions", Doctoral Thesis, Stockhom: [online], Nov. 9, 2009, <http://kth.diva-portal.org/smash/get/div2:277303/FULLTEXT01.pdf>, 171 pages.
Shiriaev et al., "Status of Smart Crane Lab Project: Modeling and Control for a Forwarder Crane", Index of/research/ifor/en/files [online], Department of Applied Physics and Electronics, Jun. 16, 2008, <www8.cs.umu.se/research/ifor/en/files/>, 30 pages.
FI Search Report for 20185725 dated Jan. 21, 2019, 2 pages.
International Preliminary Report on Patentability for PCT/FI2019/050615 for Sep. 3, 2020, 35 pages.
Opponent Statement issued on Sep. 5, 2022 in corresponding Finnish Application No. 20185725 (with translation), 27 pages.
Opponents Statement issued on Jul. 20, 2022 in corresponding Finnish Application No. 20185725 (with partial translation), 12 pages.
Opposition for revocation of Finnish patent 128475 (dated Mar. 12, 2021) (w/ machine translation).
"Harvest planning and implementation" (Metsateho Oy), https://www.metsateho.fi/korjuun-suunnittelu-ja-toteutus/), 2005 (w/ machine translation).
"Mechanical logging—Controlled for good results" (Metsateho Oy, pp. 10-35, 2017 (w/ machine translation).
Dec. 12, 2023 Office Action issued in European Patent Application No. 19854463.7, pp. 1-8.
Björn Löfgren, KTH Industrial Engineering and Management; "Kinematic Control of Redundant Knuckle Booms with Automatic Path-Following Functions," Doctoral Thesis, Nov. 9, 2009, pp. 1-171.

* cited by examiner

ARRANGEMENT AND METHOD FOR MANAGING UNLOADING OF A LOAD OF A FORESTRY MACHINE

CROSS-REFERENCE TO RELATED APPLICATIONS

This application is the U.S. national phase of International Application No. PCT/FI2019/050615 filed Aug. 29, 2019 which designated the U.S. and claims priority to FI 20185725 filed Aug. 30, 2018, the entire contents of each of which are hereby incorporated by reference.

FIELD OF THE INVENTION

This invention relates to off-road work machines and to unloading an off-road work machine and particularly to an arrangement and a method for controlling the unloading of a forestry machine.

BACKGROUND OF THE INVENTION

Forestry machines are used in mechanised harvesting for felling, delimbing, cutting to size, collecting, transporting and stacking trees. Forestry machines include e.g. harvesters, forwarders and their combinations, the so-called combined machines. Harvesters are used in mechanised harvesting for felling, delimbing and cutting trees to size. By means of harvesters, timber is typically stacked in suitable work piles by timber assortment in the felling area. Correspondingly by means of forwarders, timber is typically collected from the work piles, transported to the side of a road and unloaded into timber piles. Combined machines can handle the operations of both, i.e. harvesters and forwarders.

Forestry machines, such as forwarders and combined machines, are off-road work machines which collect timber from various work piles or stacks to be transported to the side of a road to be unloaded into various timber piles.

On the side of the road, the timber piles should be neat and the ends of said timber piles should be even. The evenness of the ends of timber piles is a safety issue and also aesthetically desirable. When the ends of timber piles are even, it is easier to transfer timber for transport onto e.g. road vehicles.

A traditionally used manner of controlling the unloading of a forestry machine operates such that a driver of the forestry machine controls the unloading of a timber load into a timber pile by manual controls. The driver of the forestry machine should be particularly attentive for making the end of the timber pile even. International specification WO2018/130747A1 describes a prior-art arrangement for controlling the unloading of a forestry machine. European specification EP2987399A1 also describes another prior-art arrangement for controlling the unloading of a forestry machine. Furthermore, Finnish specification FI20145397A describes a prior-art arrangement for controlling the boom structure of a forwarder. Additionally, Finnish utility model FI7189U describes a prior-art arrangement for controlling a timber feeder. However, it is not possible by means of arrangements described in said specifications to provide sufficiently even unloading of a timber load into a timber pile. The even unloading of a timber load into a timber pile by means of the manual control according to prior art has thus proved extremely time-consuming and awkward.

Indeed, there is a clear need for an arrangement which provides a more controllable, time-saving and reliable arrangement in unloading timber loads into timber piles than the previous arrangements.

BRIEF DESCRIPTION OF THE INVENTION

The purpose of this invention is to provide a novel kind of an arrangement for controlling the unloading of a forestry machine, by means of which, it is possible to achieve a more controllable, time-saving and reliable arrangement in unloading timber loads into timber piles than the previous arrangements e.g. on the side of a road and, by means of which, problems and disadvantages in unloading timber loads can be minimised.

It is characteristic of an arrangement according to the invention for controlling unloading of a forestry machine, in which the forestry machine comprises a load space for a timber load, a boom structure and a wood-handling tool, which arrangement further comprises a control system and a measuring apparatus of the forestry machine that said measuring apparatus is arranged to measure the location of the forestry machine and the rotation angle of the boom structure and the position of single boom parts and the position of the wood-handling tool; and in which: said control system is arranged: to define and note down the location of the timber pile, to calculate and note down the location of the edge of the timber pile, to control the wood-handling tool to pick a timber bundle from the timber load, to calculate the distance of the end of said timber pile justified on a load screen from the wood-handling tool, to calculate the unloading location of said timber bundle in the defined location of the timber pile, and to control and unload said timber bundle into the timber pile in the said calculated unloading location such that one edge of the timber pile becomes even and straight.

Preferably, said measuring apparatus is arranged to measure the motion space of single boom parts of the boom structure.

Preferably, said measuring apparatus is arranged to measure the rotation angle of the wood-handling tool.

Preferably, said control system is arranged to control the rotation angle of said boom structure and the position of single boom parts of the boom structure and the location of said wood-handling tool.

Preferably, said measuring apparatus is arranged to measure the position of grabbing means of the wood-handling tool.

Preferably, said control system is arranged to identify and/or control the position of the grabbing means of the wood-handling tool.

Preferably, said control system is arranged to calculate the height of the timber pile based on the unloading location of unloaded timber bundles.

Preferably, said control system is arranged to automatically identify the location of the forestry machine and/or the location of the timber-pile location.

Preferably, said control system is arranged to automatically identify the position of the boom structure of the forestry machine and/or its rotation angle by identifying the position and/or motion space of single boom parts.

Preferably in the arrangement, said forestry machine is a forwarder.

It is characteristic of a method according to the invention for controlling unloading of a forestry machine, in which the forestry machine comprises a load space for a timber load, a boom structure and a wood-handling tool attached to said boom structure, that the method comprises the steps of: defining and noting down the location of the timber pile, calculating and noting down the location of the edge of the timber pile, picking a timber bundle from the timber load by the wood-handling tool, calculating the distance of the end justified on a load screen of the edge of said timber pile from the wood-handling tool, calculating an unloading location for said timber bundle in the defined location of the timber pile, and controlling and unloading said timber bundle into the timber pile in the said calculated unloading location such that one edge of the timber pile becomes even and straight.

Preferably, the location of the timber pile is noted down by picking a timber bundle from the timber load of said load space and by transferring and unloading said timber bundle on the first edge of the timber-pile location.

Alternatively, the location of the timber pile is noted down by picking a first timber bundle from the timber load of said load space and by transferring and unloading said timber bundle on the first edge of the timber-pile location and by picking a second timber bundle from the timber load of said load space and by transferring and unloading said second timber bundle on the second edge of the timber-pile location.

Preferably, the method comprises a step for controlling the wood-handling tool controlled against the screen against the load screen and registering the location of said load screen down.

Preferably in the method, said forestry machine is a forwarder.

BRIEF DESCRIPTION OF THE DRAWINGS

Some embodiments of the invention will now be described in greater detail by means of some preferred embodiments, with reference to the attached drawings, in which.

The figures are not to scale, and some features may have been simplified, emphasised or faded out to improve the clarity of the essential features of the figures.

DETAILED DESCRIPTION OF THE INVENTION

Figure 1:
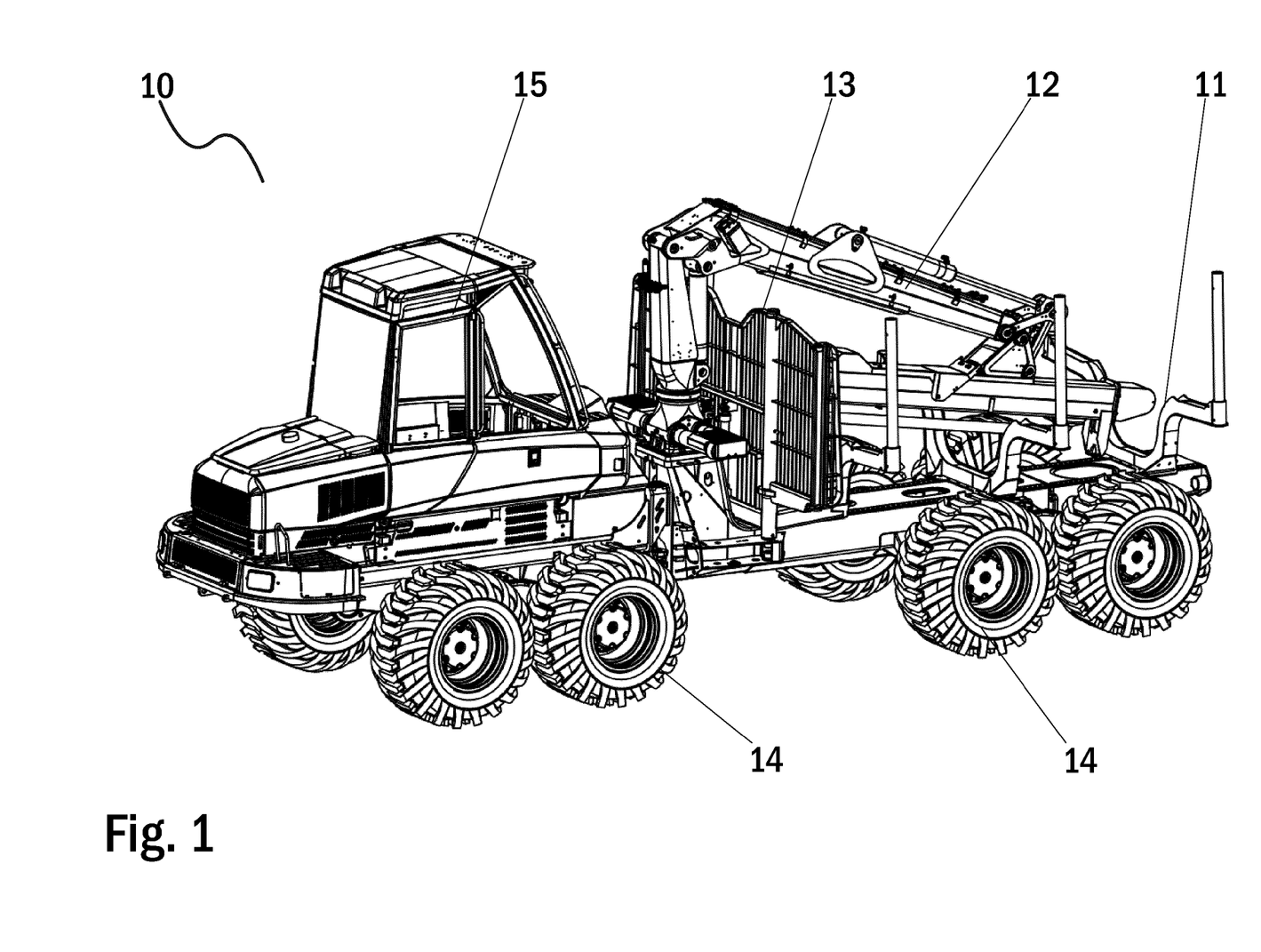
FIG. 1 is a perspective view of a forestry machine according to an embodiment of the invention.

FIG. 1 is a perspective view of a forestry machine according to an embodiment of the invention. FIG. 1 shows a forestry machine 10 according to an embodiment according to the invention, in more detail a forwarder 10. The forestry machine 10 according to the invention is described here without a timber load. In different embodiments, the forestry machine 10 can also comprise another forestry machine, e.g. a combination of a forwarder and harvester or another drive machine suitable for carrying a load.

The forestry machine 10 according to an embodiment of the invention can comprise a load space 11 for stacking a timber pile to be transported. The forestry machine 10 can additionally comprise a boom structure 12 and a wood handling tool attached to the boom structure 12, such as a load bucket. Furthermore, the forestry machine 10 can comprise a rotating pivot device, the so-called rotator, arranged between said boom structure 12 and said wood-handling tool. Additionally, the forestry machine 10 can comprise a cabin 15 and a load screen 13 arranged on the end of the cabin 15 in the load space 11. The forestry machine 10 according to an embodiment of the invention is arranged to collect timber from the work piles of the felling location, to transport the collected timber load to the side of a road and to unload the timber load into timber piles.

The forestry machine 10 can further comprise a moving means 14, which moving means 14 may comprise at least one of the following: wheels arranged on an axle, wheels arranged on a swinging axle, wheels arranged on a tandem axle, a track system or another means known as such to cause the forestry machine to move in relation to its working surface. It is obvious for those skilled in the art that typically the work machine additionally comprises numerous structural and functional components and entities that depend on the work machine type, such as a power source and so forth.

The forestry machine 10 according to the invention can further comprise an arrangement for controlling the unloading of the forestry machine. By means of the control arrangement of the unloading of a forestry machine according to the invention the driver is assisted in the unloading of a timber load 22 of the forestry machine 10 such that the timber load 22 can be cleanly unloaded into timber piles into a desired timber-pile location 20.

Figure 2:
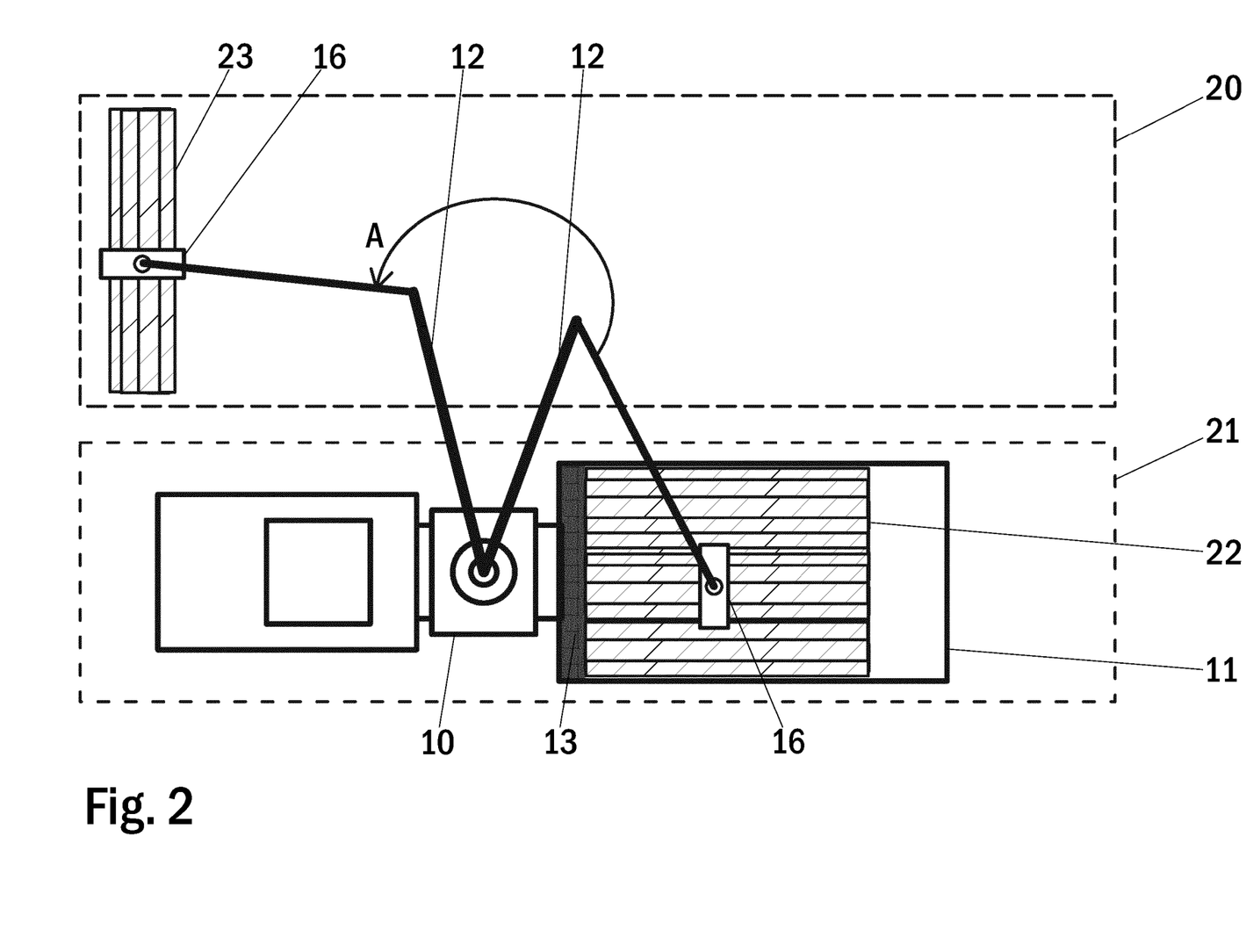
FIG. 2 shows a top view of an illustration of an arrangement according to an embodiment of the invention for controlling the unloading the load of a forestry machine.

FIG. 2 shows a top view of an illustration of an arrangement according to an embodiment of the invention for controlling the unloading the load of a forestry machine. In an arrangement according to an embodiment of the invention, the driver of a forestry machine 10, such as a forwarder 10, selects/identifies a suitable location 20 for a timber pile, e.g. a timber-pile location 20. on the side of a road The driver controls the forestry machine 10 into an area 21 next to said timber-pile location 20. In an arrangement according to an embodiment of the invention, the timber load 22 in the load space 11 of the forestry machine 10 has already been justified in the loading step such that the ends of timber are evenly against a load screen 13 of the load space 11 of the forest machine 10.

In an arrangement according to an embodiment of the invention, the driver of a forestry machine 10 notes down a timber-pile location 20 by means of the boom structure 12 of the forestry machine 10 and the wood-handling tool 16 attached to said boom structure 12. The noting down of the timber-pile location 20 can be done e.g. by picking a timber bundle 23 from the timber load 22 of the load space 11 of the forestry machine 10 and by transferring (Arrow A) and unloading said timber bundle 23 on the first edge of the timber-pile location 20, on the left edge in FIG. 2. In the arrangement according to the invention, the control system of the forestry machine 10 then reads that the timber-pile location 20 starts from said unloading location of the timber bundle 23. The control system of the forestry machine 10 can also read that the filling direction of the timer pile is in the direction of said unloading location of the timber bundle 23 towards the forestry machine 10, starting from the left edge to the right in FIG. 2. Alternatively, the driver can notify of the filling direction of the timber pile to the control system in some other way, e.g. by a separate command or a certain predetermined control motion. If the driver so desires, they can justify the timber bundle 23 against the load screen 13, if the ends have not been straight against the load screen 13. Preferably, this justifying motion of the timber bundle against the screen can be an automatic or a semiautomatic action. Preferably in connection with this action, the grabbing means of the wood-handling tool 16, e.g. the jaws of a grabber are opened, whereby it is possible for the single timbers in the bundle to justify in the bundle onto the same level.

In an arrangement according to an embodiment of the invention, the control system of the forestry machine 10 always identifies the location of the wood-handling tool 16 and is able to control the position of the wood-handling tool 16 and the rotation angle of the wood-handling tool 16. The position of the wood-handling tool 16 can be calculated based on sensor measuring data, such as on sensor data of the boom structure, or in some other way. Furthermore, the control system of the forestry machine 10 is arranged to identify and/or control the position of the grabbing means of the wood-handling tool 16, e.g. the position of the jaws of a grabber.

When the forestry machine 10 picks by the wood-handling tool 16 a timber bundle from the timber load 22 of the load space 11, the control system of the forestry machine 10 knows beforehand the location of the load screen 13 and, thus, also the distance of the end of a timber bundle justified against the load screen from the wood-handling tool 16. The control system can know that location of the load screen 13 e.g. such that the driver controls that wood-handling tool 16 against the screen and commands the control system to register the location of the load screen 13 down. Justifying the timber bundle 23 can be acknowledged by the grabber closed action because, when justifying the ends, the wood-handling tool 16 must be opened slightly.

In an arrangement according to an embodiment of the invention, when the forestry machine 10 picks a timber bundle from the timber load 22 of the load space 11, the measuring apparatus of the forestry machine 10 measures and/or identifies the distance of the end of a timber bundle justified against the load screen 13 from the wood-handling tool 16. When the forestry machine 10 picks a timber bundle from the timber load 22 of the load space 11, the control system of the forestry machine 10 knows the distance of the end of a timber bundle from the wood-handling tool 16. The control system of the forestry machine 10 thus knows with the aid of the measuring apparatus the distance of the wood-handling tool 16, e.g. a grabber, from the screen irrespective of in which position of the timber load 22 of the load space 11 the wood-handling tool 16 picks timber. When the driver takes the first timber bundle 23 into the timber pile of the timber-pile location 20 and opens the wood-handling tool 16, the control system calculated and notes down the location of the edge of the timber pile. Then, the control system can help the driver to take each timber bundle at an accurate distance from the machine and the edge of the timber pile becomes even and straight.

In an arrangement according to an embodiment according to the invention, the control system of the forest machine 10 can also calculate the height of the timber bundle based on the previous unloading location of the timber bundles 23 of the wood-handling tool 16 and thus adjust the unloading height of the wood-handling tool 16 for each timber bundle 23 almost accurate. In an arrangement according to an embodiment of the invention, the control system of the forestry machine 10 can control the rotation angle of the wood-handling tool 16 e.g. by means of the rotation angle of the rotator. Hence, the control system of the forestry machine 10 also knows the accurate direction of the bundle and the system can turn the timbers in the timber bundle 23 automatically parallel with the pile and the timbers of the timber bundle 23 stay at an angle of 90 degrees in relation to the side of the pile.

When in the arrangement according to an embodiment of the invention the timber-pile location 20 has been designated, the control system of the forestry machine 10 automatically assists in controlling and unloading of the timber pile 22. The control system of the forestry machine 10 calculates a suitable unloading location for each timber bundle picked from the timber load 22 of the load space 11 of the forestry machine 10 by means of the wood-handling tool 16 and controls said timber bundles a bundle at a time into the calculated unloading location neatly in a timber pile. Hence, a timber pile even and/or straight of its one edge can be provided into a designated timber-pile location 20. When the timber load 22 has been unloaded into the timber pile of the timber-pile location 20, the forestry machine 10 can leave to pick a new load from the felling area.

In an arrangement according to an embodiment of the invention, the forestry machine 10 return with a new timber load back to close to the timber-pile location 20 on the side of a road. When the driver controls the forestry machine 10 in an area 21 next to said timber-pile location 20, the control system of the forestry machine 10 automatically identifies the location of the forestry machine 10, preferably in relation to the timber pile and the location of the timber-pile location 20, and reads that the forestry machine 10 has returned with a new timber load 22. Furthermore, the control system of the forestry machine 10 remembers the filling situation of the timber pile in the timber-pile location 20 and automatically assists in unloading the new timber load 22 neatly in the timber pile and controls the timber bundles picked from the timber load 22 of the load space 11 of the forestry machine 10 by means of the wood-handling tool 16 a bundle at a time into an even timber pile in the designated timber-pile location 20. Additionally, the driver can notify the control system of some control command related to the filling of the timber pile e.g. by a separate command or a certain predetermined control motion.

Figure 3:
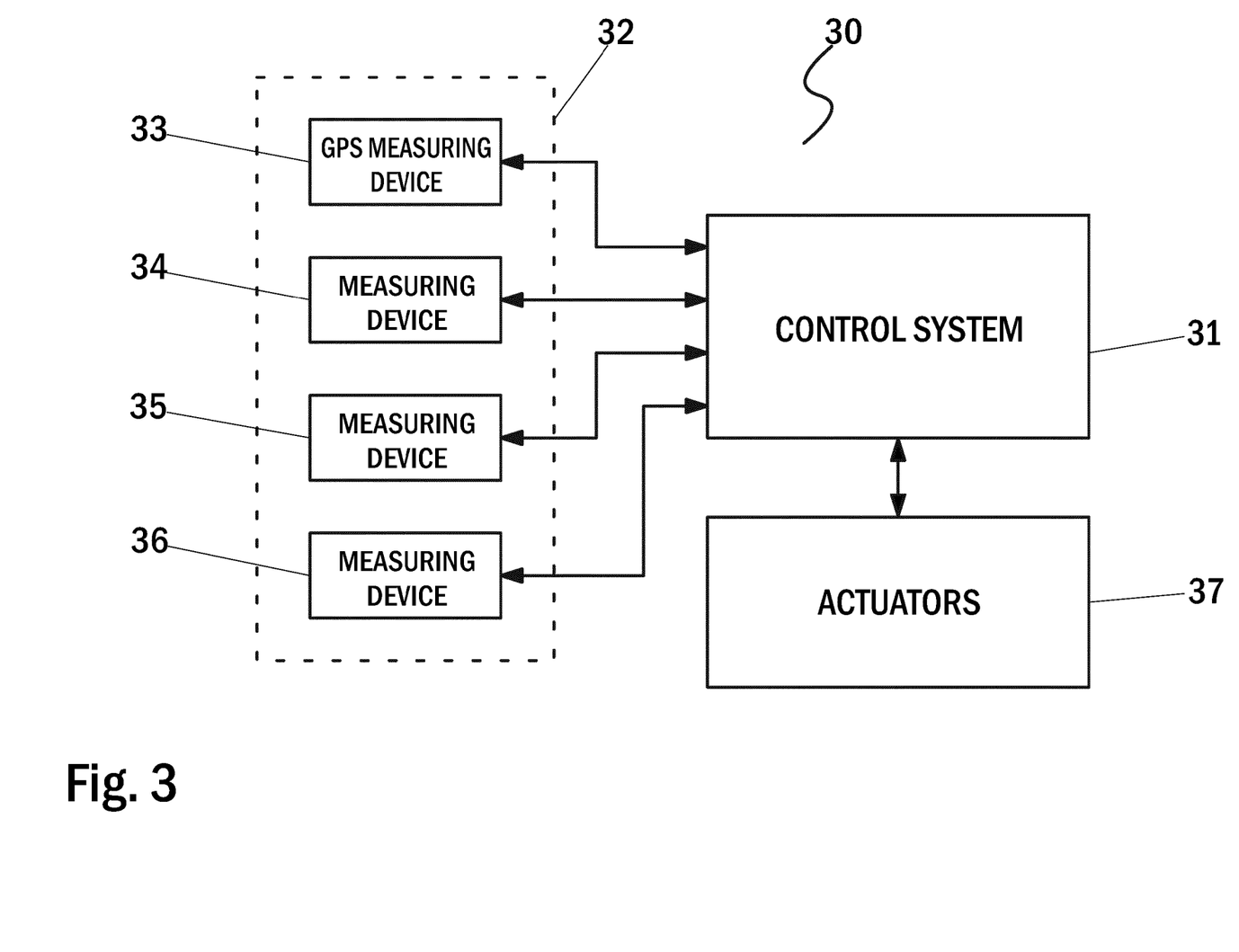
FIG. 3 shows a block diagram of the structure of a control arrangement of unloading of a forestry machine according to an embodiment of the invention.

FIG. 3 shows a block diagram of the structure of a control arrangement of unloading of a forestry machine according to an embodiment of the invention. The control arrangement 30 of the unloading of a forestry machine according to an embodiment of the invention comprises a control system 31, a measuring apparatus 32 and actuators 37 of the forestry machine. The measuring apparatus 32 of the control arrangement 30 according to the invention comprises at least two measuring devices 33-36, by means of which, it is possible to measure some required measuring variables, such as e.g. the location of the forestry machine 10, preferably in relation to the timber pile, the position of the wood-handling tool 16, preferably in relation to the timber pile and the forestry machine 10 and its rotation angle and the location and rotation angle of the timber bundle picked by means of the wood-handling tool 16. Said at least two measuring devices 33-36 of the measuring apparatus 32 can comprise at least one GPS measuring device 33 for defining the location of the forestry machine 10.

Figure 4:
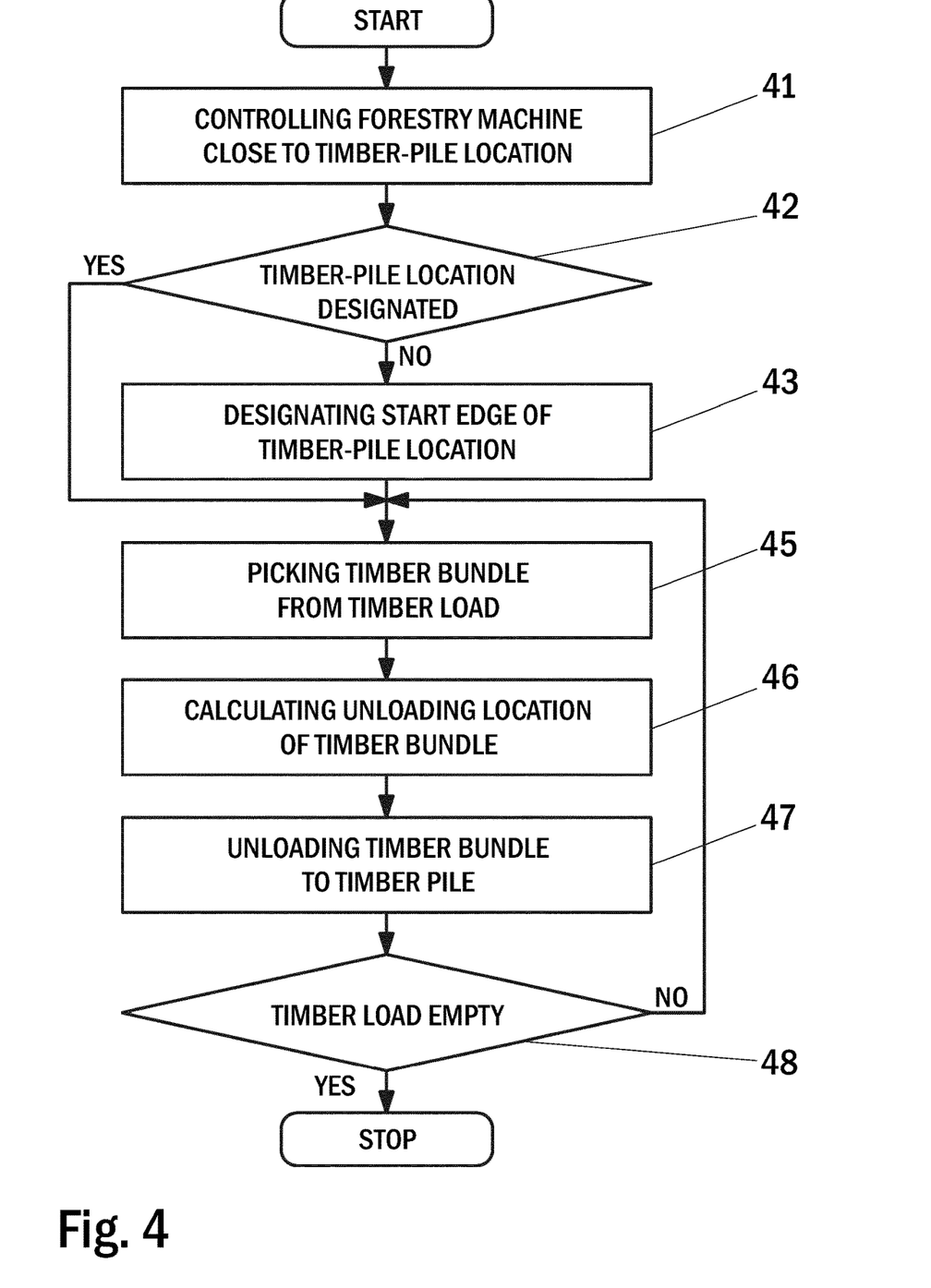
FIG. 4 shows a block diagram of a method according to an embodiment of the invention for controlling the unloading of a forestry machine.

FIG. 4 shows a block diagram of a method according to an embodiment of the invention for controlling the unloading of a forestry machine. In a method according to an embodiment of the invention for the unloading of the load of a forestry machine, the driver first selects/identifies a suitable location 20 for the timber pile, e.g. a timber-pile location 20 on the side of a road, and controls the forestry machine 10 close to the timber-pile location they have selected/identified 41.

Next, the control system 31 of the forestry machine 10 identified 42 if the timber-pile location has been previously designated or not. If the timber-pile location has not been designated previously, the timber-pile location is next designated 43. In a method described according to an embodiment of the invention, the driver of a forestry machine 10 notes down a timber-pile location 20 by means of the boom structure 12 of the forestry machine 10 and the wood-handling tool 16 attached to said boom structure 12. The start edge of the timber-pile location can be designated 43 e.g. by picking a timber bundle 23 from the timber load 22 of the load space 11 of the forestry machine 10 and by transferring and unloading said timber bundle 23 on the start edge of the timber-pile location 20. After having designated 43 the timber-pile location, it is possible to transfer to the unloading step 45-48 of the timber load. Also correspondingly, if the control system 31 in the identifying step identifies 42 that the timber-pile location has been designated previously, it is possible to transfer to the unloading step 45-48 of the timber load.

Next in the unloading step 45-48 of the timber load, the forestry machine 10 picks 45 by the wood-handling tool 16 a timber bundle from the timber load 22 of the load space 11. When the timber pile has been picked 45 to the wood-handling tool 16, the control system 31 of the forestry machine 10 calculates 46 a suitable unloading location for the timber bundle in question and controls said timber bundles a bundle at a time into the calculated 46 suitable unloading where the timber bundle is unloaded 47 neatly in a timber pile. When the timber load has been unloaded empty 48 into the timber pile of the timber-pile location 20, the unloading step 45-48 is stopped and the forestry machine 10 can leave to pick a new load from the felling area.

Figure 5:
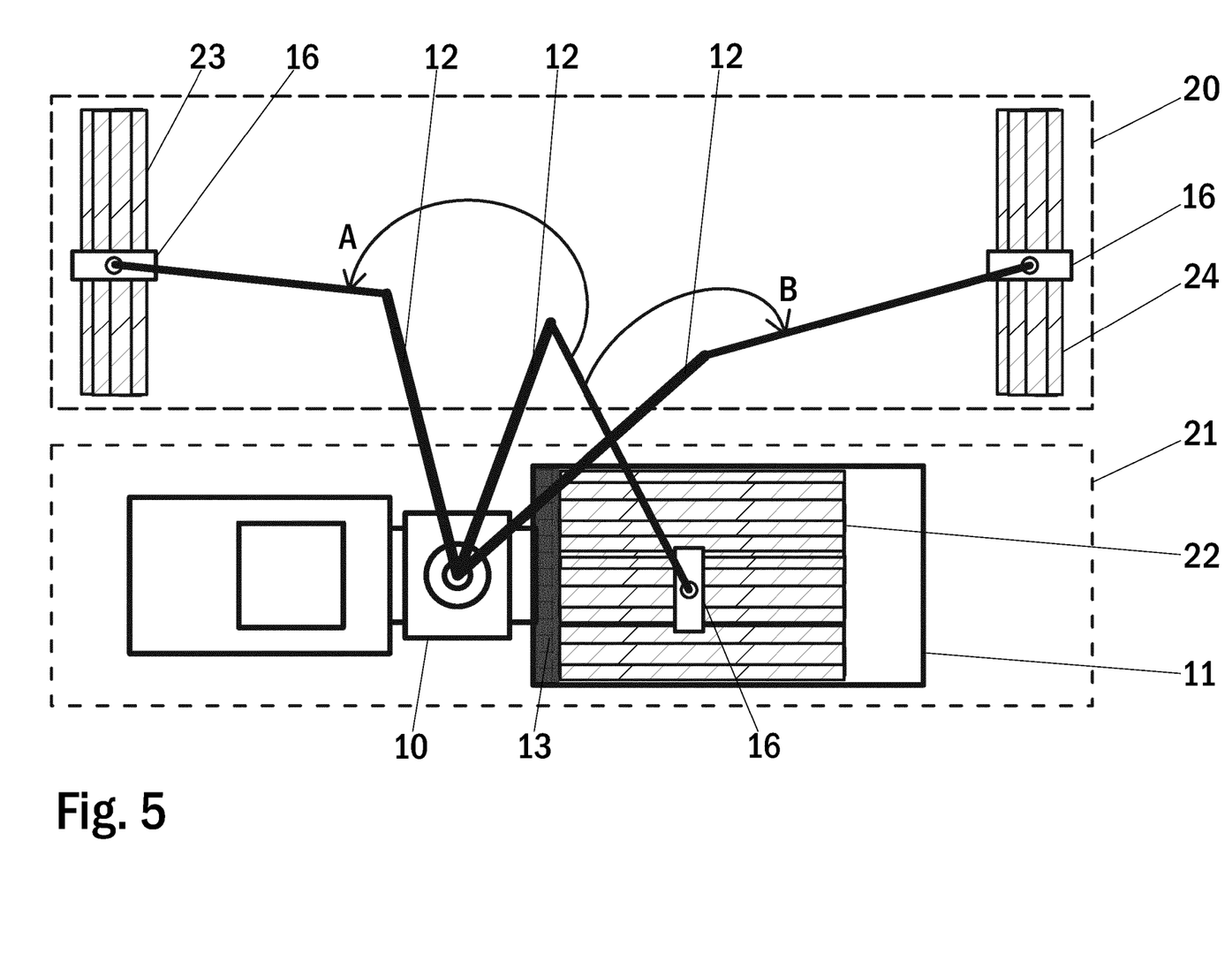
FIG. 5 shows a top view of an illustration of an alternative arrangement according to an embodiment of the invention for controlling the unloading the load of a forestry machine.

FIG. 5 shows a top view of an illustration of an alternative arrangement according to an embodiment of the invention for controlling the unloading the load of a forestry machine. In an alternative arrangement according to an embodiment of the invention, the driver of a forestry machine 10, such as a forwarder 10, selects/identifies a suitable location 20 for a timber pile and control the forestry machine 10 in an area 21 next to said timber-pile location 20. The driver of the forestry machine 10 designated the timber-pile location 20 by means of the boom structure 12 of the forestry machine 10 and the wood-handling tool 16 attached to said boom structure 12.

In an arrangement according to an alternative embodiment of the invention, the noting down of the start edge of the timber-pile location 20 can be done e.g. by picking a first timber bundle 23 from the timber load 22 of the load space 11 of the forestry machine 10 and by transferring (Arrow A) and unloading said first timber bundle 23 on the first edge of the timber-pile location 20, on the left edge in FIG. 5. Similarly, the noting down of the stop edge of the timber-pile location 20 can be done e.g. by picking a timber bundle 24 from the timber load 22 of the load space 11 of the forestry machine 10 and by transferring (Arrow B) and unloading said timber bundle 24 on opposite second edge of the timber-pile location 20, on the right edge in FIG. 5.

In the arrangement according to the invention, the control system of the forestry machine 10 then reads that the timber-pile location 20 starts from said unloading location of said first timber bundle 23 and stops in said unloading location of the second timber bundle 24. The control system of the forestry machine 10 can also thus read that the timber pile can be filled evenly between the above-mentioned unloading location of the timber bundles 23, 24.

When in the arrangement according to an alternative embodiment of the invention the timber-pile location 20 has been designated, the control system of the forestry machine 10 automatically assists in controlling and unloading of the timber pile 22. The control system of the forestry machine 10 calculates a suitable unloading location for each timber bundle picked from the timber load 22 of the load space 11 of the forestry machine 10 by means of the wood-handling tool 16 and controls said timber bundles a bundle at a time into the calculated unloading location neatly in a timber pile. Hence, a timber pile even and/or straight of its one edge can be provided into a designated timber-pile location 20. When the timber load 22 has been unloaded into the timber pile of the timber-pile location 20, the forestry machine 10 can leave to pick a new load from the felling area. In an arrangement according to an embodiment of the invention, the forestry machine 10 return with a new timber load back to close to the timber-pile location 20 on the side of a road. When the driver controls the forestry machine 10 in an area 21 next to said timber-pile location 20, the control system of the forestry machine 10 automatically identifies the location of the forestry machine 10, preferably in relation to the timber pile and the location of the timber-pile location 20, and reads that the forestry machine 10 has returned with a new timber load 22. Furthermore, the control system of the forestry machine 10 remembers the filling situation of the timber pile in the timber-pile location 20 and automatically assists in unloading the new timber load 22 neatly in the timber pile and controls the timber bundles picked from the timber load 22 of the load space 11 of the forestry machine 10 by means of the wood-handling tool 16 a bundle at a time into an even timber pile in the designated timber-pile location 20. Additionally, the driver can notify the control system of some control command related to the filling of the timber pile e.g. by a separate command or a certain predetermined control motion.

Figure 6:
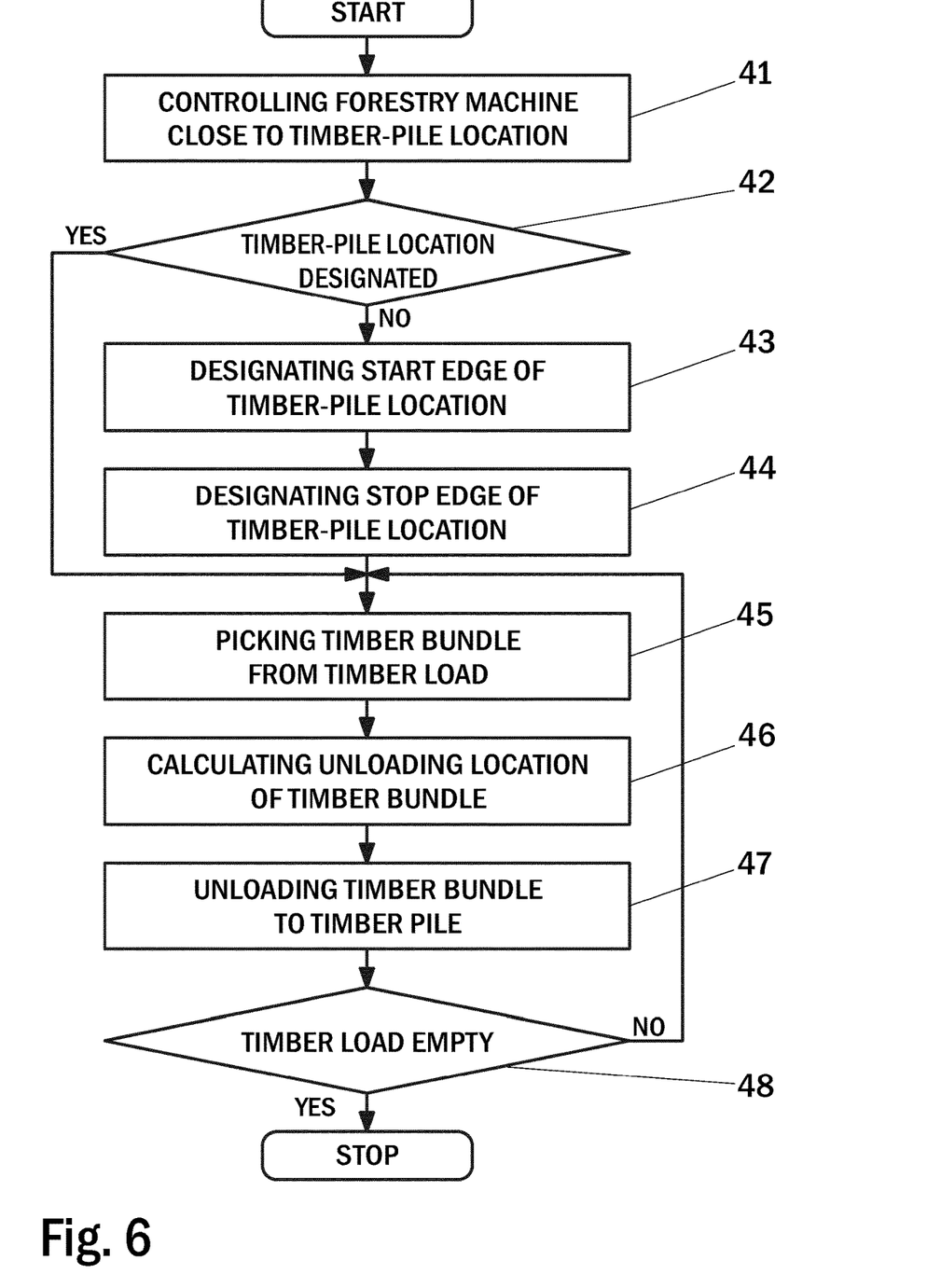
FIG. 6 shows a block diagram of a method according to an alternative embodiment of the invention for controlling the unloading of a forestry machine.

FIG. 6 shows a block diagram of a method according to an embodiment of the invention for controlling the unloading of a forestry machine. In a method according to an embodiment of the invention for the unloading of the load of a forestry machine, the driver first selects/identifies a suitable location 20 for the timber pile, e.g. a timber-pile location 20 on the side of a road, and controls the forestry machine 10 close to the timber-pile location they have selected/identified 41. Next, the control system 31 of the forestry machine 10 identifies 42 if the timber-pile location has been previously designated or not. If the timber-pile location has not been designated previously, the timber-pile location is next designated 43, 44. In a method described according to an embodiment of the invention, the driver of a forestry machine 10 notes down 43, 44 a timber-pile location 20 by means of the boom structure 12 of the forestry machine 10 and the wood-handling tool 16 attached to said boom structure 12.

The start edge of the timber-pile location can be designated 43 e.g. by picking a first timber bundle 23 from the timber load 22 of the load space 11 of the forestry machine 10 and by transferring and unloading said timber bundle 23 on the start edge of the timber-pile location 20. Similarly, the stop edge of the timber-pile location can be designated 44 e.g. by picking a second timber bundle 24 from the timber load 22 of the load space 11 of the forestry machine 10 and by transferring and unloading said timber bundle 24 on the stop edge of the timber-pile location 20. After having designated 43, 44 the timber-pile location, it is possible to transfer to the unloading step 45-48 of the timber load. Also correspondingly, if the control system 31 in the identifying step identifies 42 that the timber-pile location has been designated previously, it is possible to transfer to the unloading step 45-48 of the timber load.

Next in the unloading step 45-48 of the timber load, the forestry machine 10 picks 45 by the wood-handling tool 16 a timber bundle from the timber load 22 of the load space 11. When the timber pile has been picked 45 to the wood-handling tool 16, the control system 31 of the forestry machine 10 calculates 46 a suitable unloading location for the timber bundle in question and controls said timber bundles a bundle at a time into the calculated 46 suitable unloading where the timber bundle is unloaded 47 neatly in a timber pile. When the timber load has been unloaded empty 48 into the timber pile of the timber-pile location 20, the unloading step 45-48 is stopped and the forestry machine 10 can leave to pick a new load from the felling area.

Figure 7:
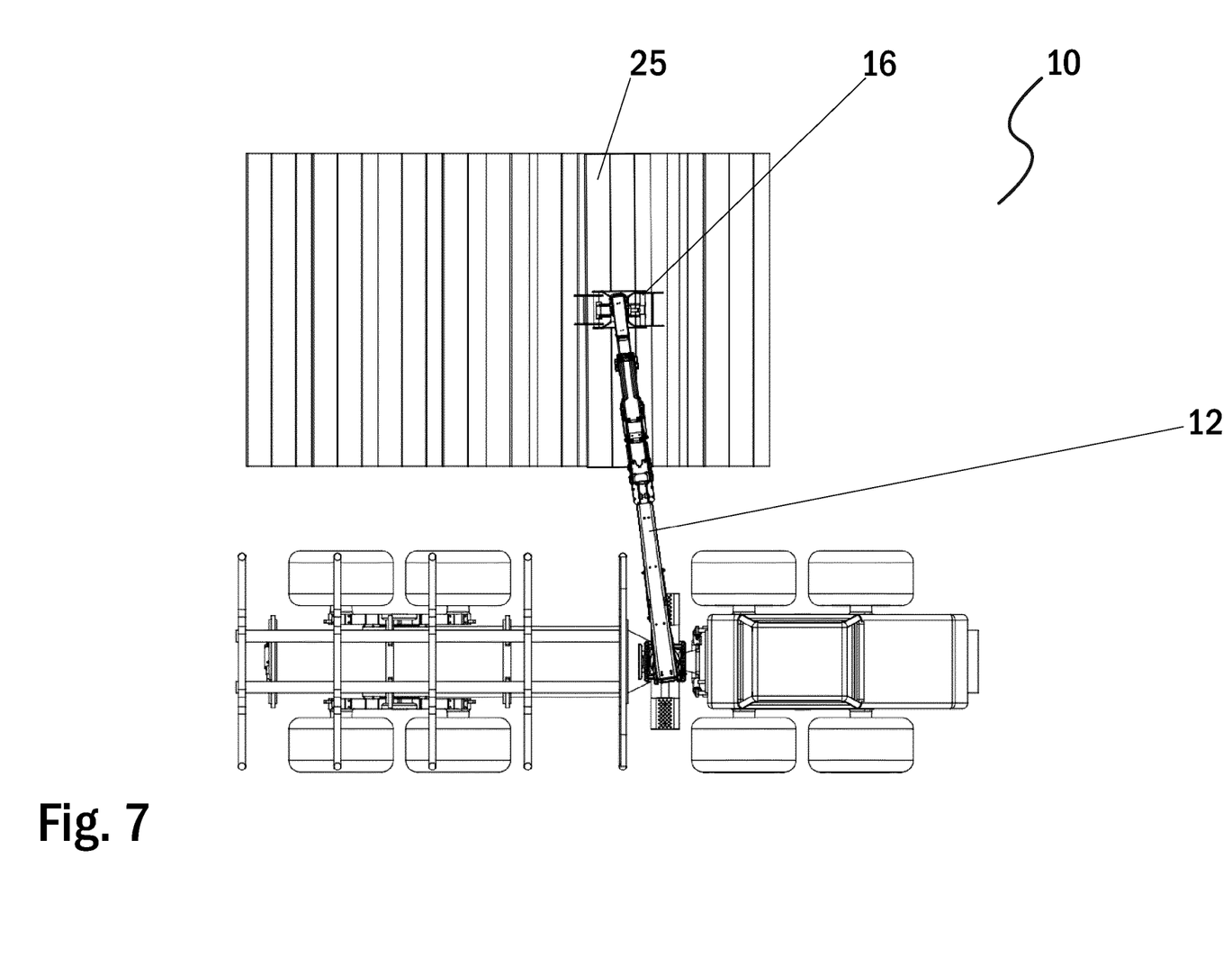
FIG. 7 shows a top view of an illustration of an unloading situation of a forestry machine according to an embodiment of the invention.

FIG. 7 shows a top view of an illustration of an unloading situation of a forestry machine according to an embodiment of the invention. In an unloading situation of the load of a forestry machine according to an embodiment of the invention, the forestry machine 10 is placing the timber bundle 25 in place by means of the boom structure 12 and the wood-handling tool 16.

Figure 8:
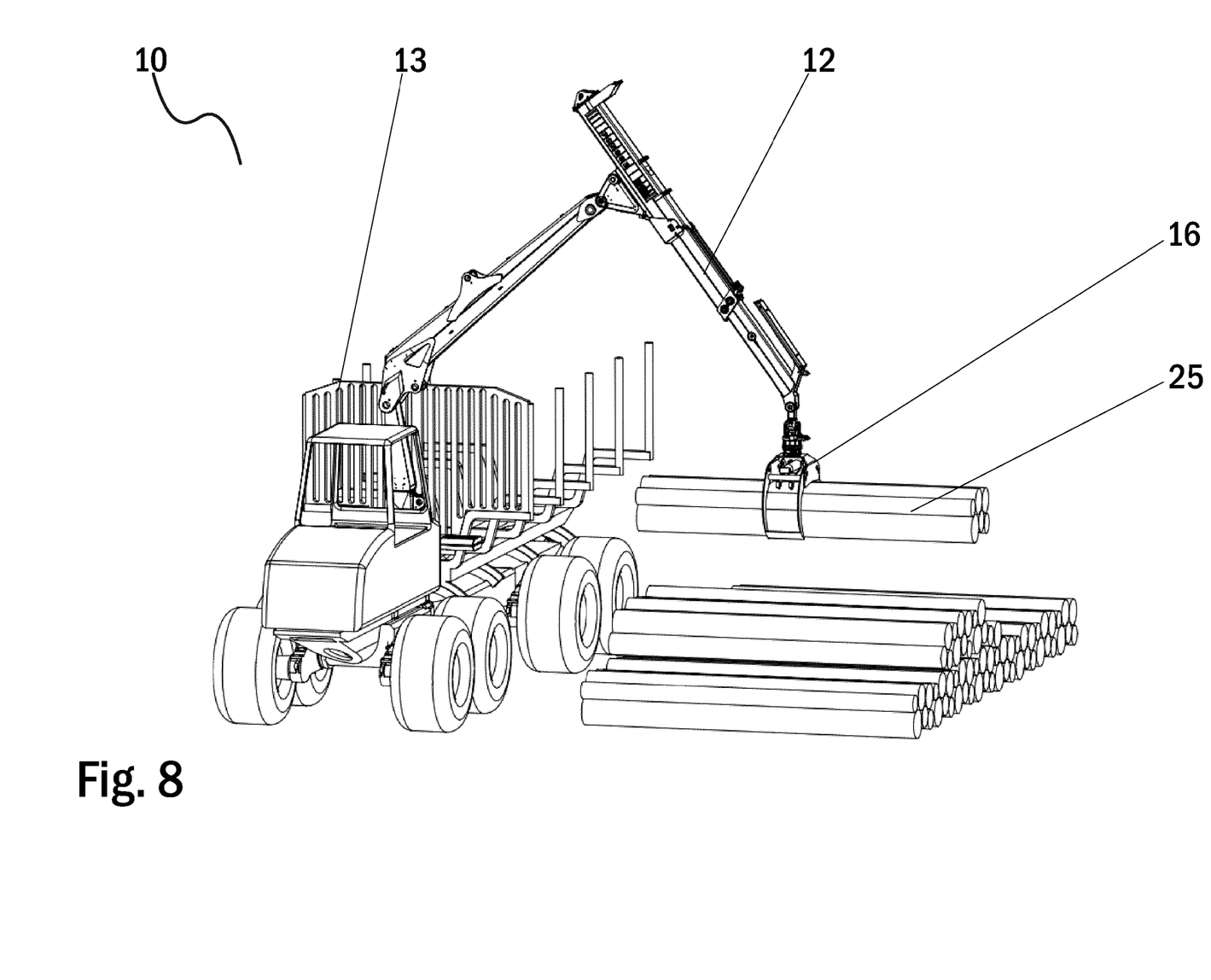
FIG. 8 shows a perspective view of an illustration of an unloading situation of a forestry machine according to an embodiment of the invention.

FIG. 8 shows a perspective view of an illustration of an unloading situation of a forestry machine according to an embodiment of the invention. In an unloading situation of the load of a forestry machine according to an embodiment of the invention, the forestry machine 10 is placing the timber bundle 25 in place by means of the boom structure 12 and the wood-handling tool 16. In FIG. 8, the load screen is designated by reference number 13.

Figure 9:
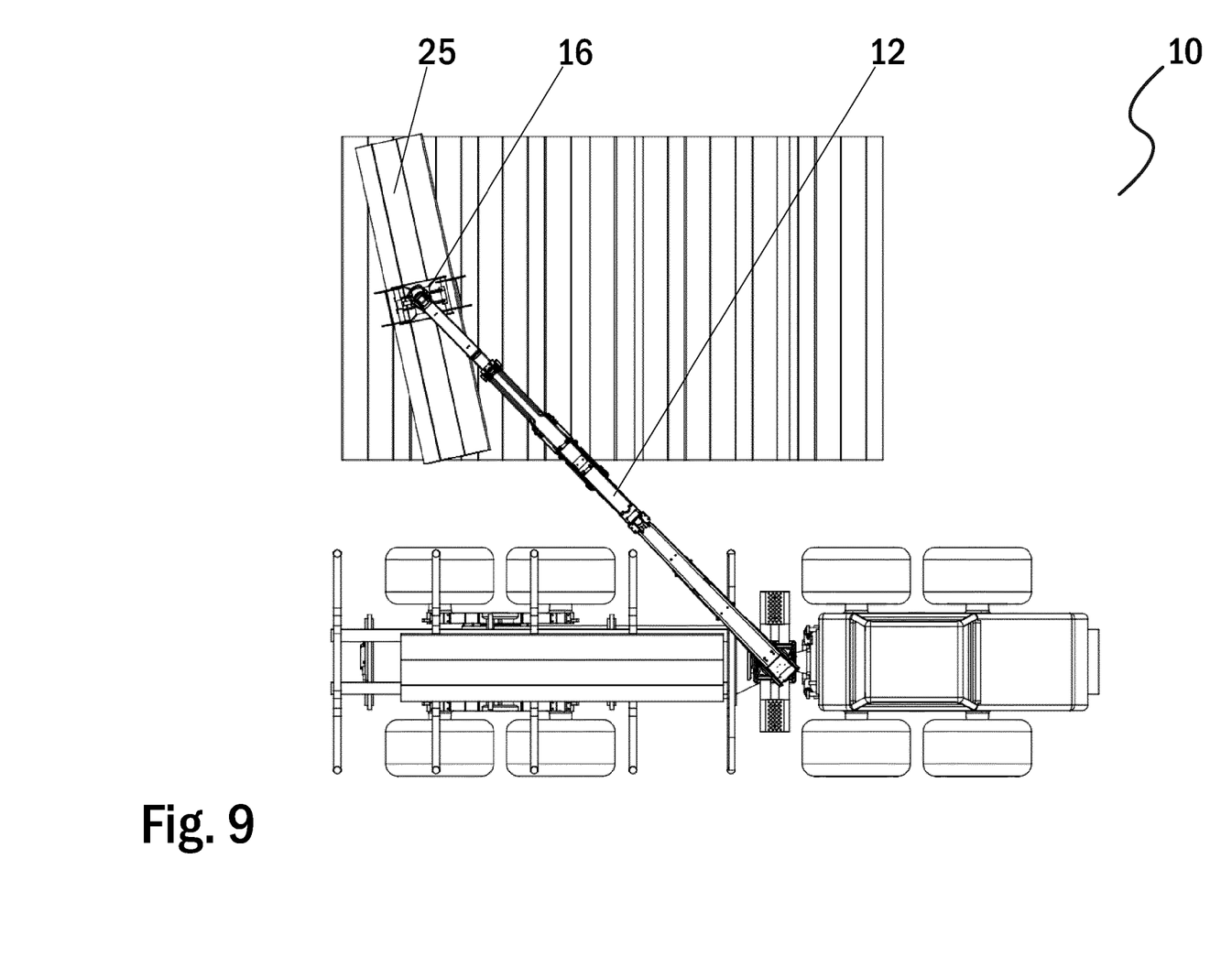
FIG. 9 shows a first top view of an illustration the progress of the unloading of a forestry machine according to an embodiment of the invention.

FIG. 9 shows a first top view of an illustration the progress of the unloading of a forestry machine according to an embodiment of the invention. In an unloading situation of the load of a forestry machine according to an embodiment of the invention, the forestry machine 10 is placing the timber bundle 25 in place by means of the boom structure 12 and the wood-handling tool 16. In the unloading step of the load shown in FIG. 9, there is still timber load left in the load space of the forestry machine.

Figure 10:
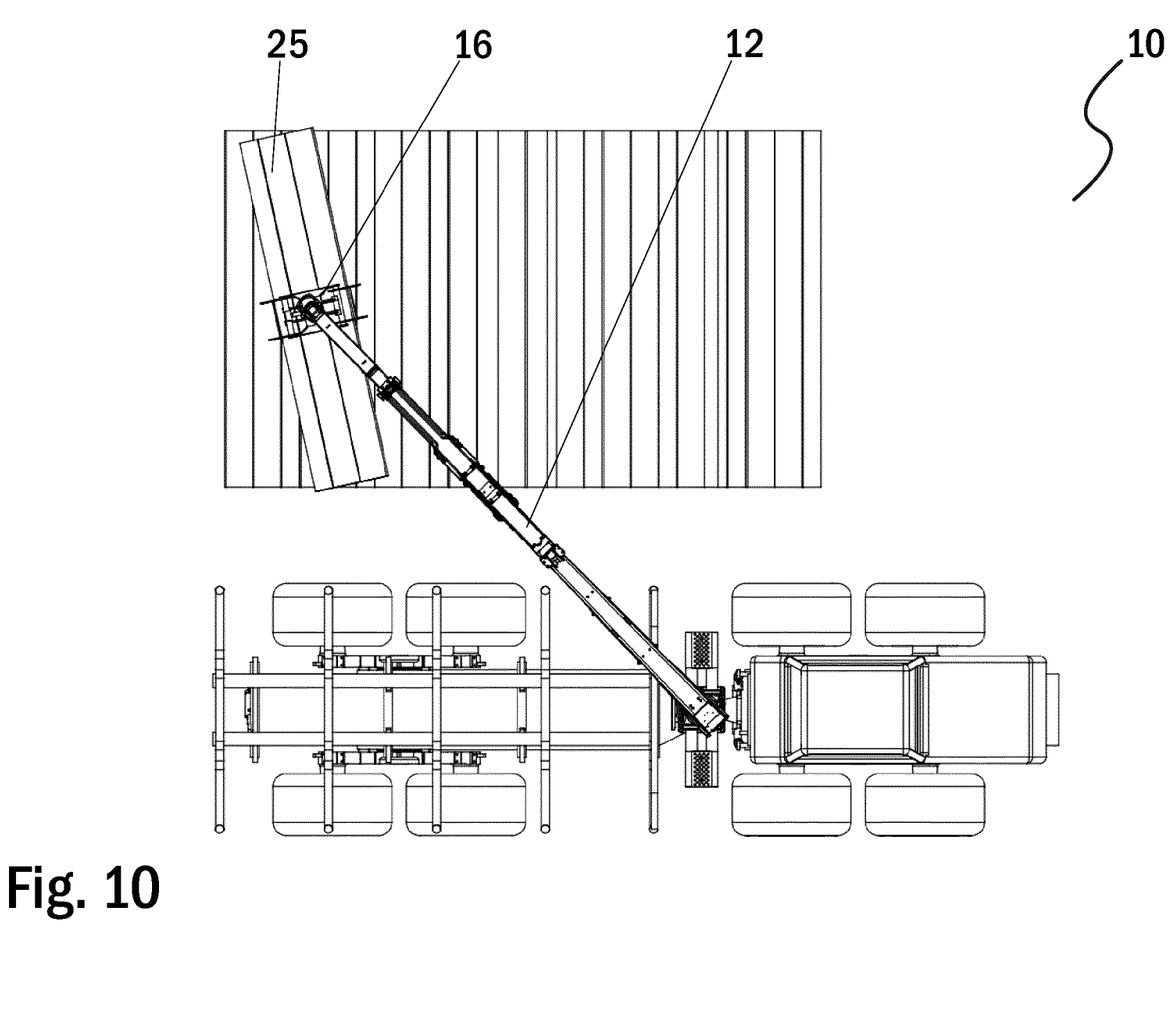
FIG. 10 shows a second top view of an illustration the progress of the unloading of a forestry machine according to an embodiment of the invention.

FIG. 10 shows a second top view of an illustration the progress of the unloading of a forestry machine according to an embodiment of the invention. In an unloading situation of the load of a forestry machine according to an embodiment of the invention, the forestry machine 10 is placing the last timber bundle 25 of the timber load in place by means of the boom structure 12 and the wood-handling tool 16. In the unloading step of the load shown in FIG. 10, there is no timber load left and the load space of the forestry machine is empty. In FIG. 10, the control system of the forestry machine has not yet controlled the wood-handling tool to turn the timber bundle 25 straight into a suitable timber-pile location.

Figure 11:
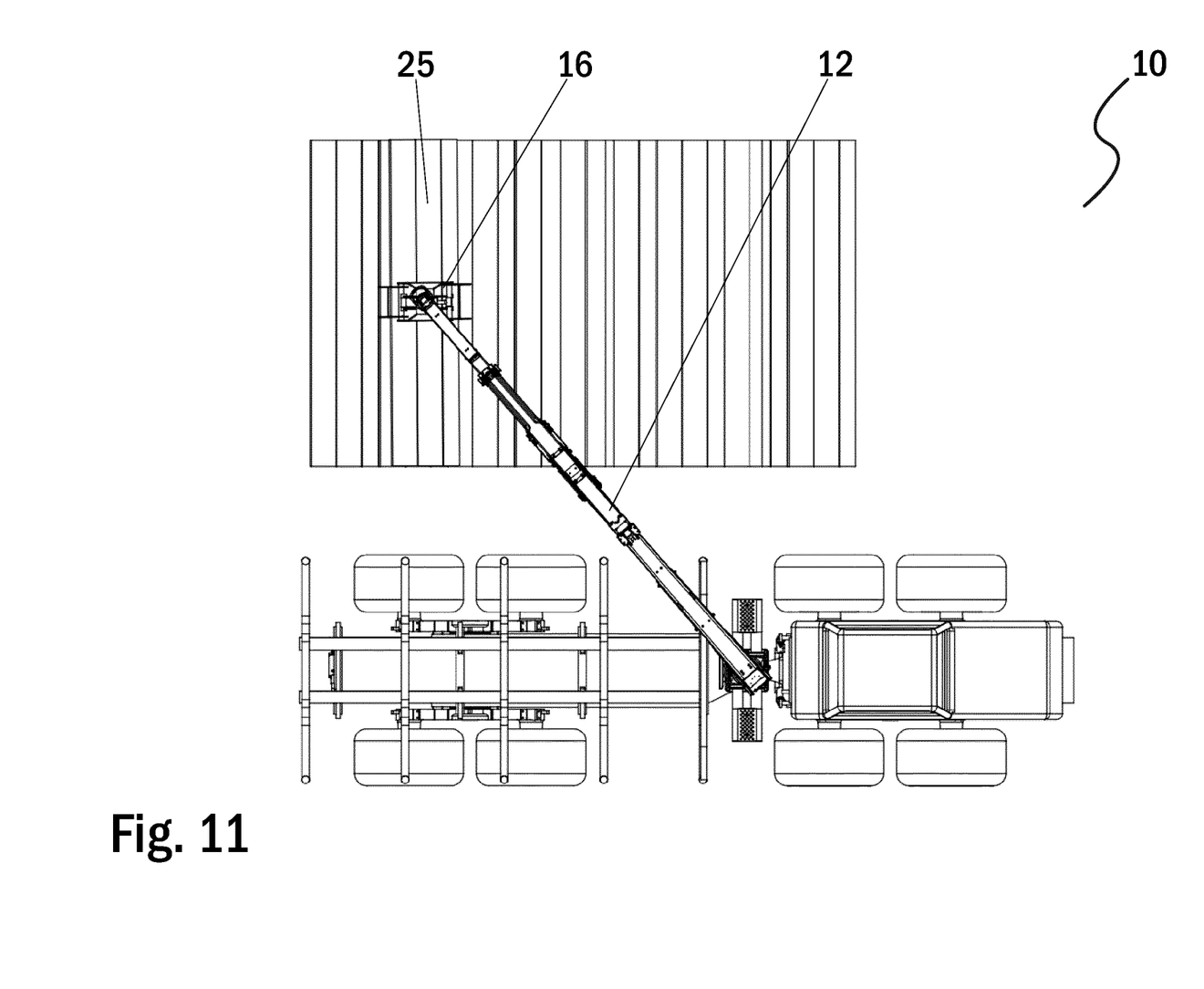
FIG. 11 shows a third top view of an illustration the progress of the unloading of a forestry machine according to an embodiment of the invention.

FIG. 11 shows a third top view of an illustration the progress of the unloading of a forestry machine according to an embodiment of the invention. In an unloading situation of the load of a forestry machine according to an embodiment of the invention, the forestry machine 10 ready to unload the last timber bundle 25 of the timber load in place by means of the boom structure 12 and the wood-handling tool 16. In the unloading step of the load shown in FIG. 11, there is no timber load left and the load space of the forestry machine is empty. In FIG. 11, the control system of the forestry machine has now controlled the wood-handling tool to turn the timber bundle 25 straight and is thus ready to unload the timber bundle 25 into a suitable timber-pile location.

The control system of the unloading of a timber load according to an arrangement according to the invention facilitates the unloading of a timber load considerably. The control system of the forestry machine according to the arrangement according to the invention automatically assists in controlling and unloading of a timber pile into a designated timber-pile location. In the arrangement according to the invention, the control system of the forestry machine assists the driver in taking the timber bundle always on the accurate distance from the machine and the edge of the timber pile then becomes straight irrespective of the position in which the wood-handling tool grabs the timber bundle in their length direction.

Those skilled in the art will find it obvious that, as technology advances, the basic idea of the invention may be implemented in many different ways. The invention and its embodiments are thus not restricted to the above-described examples but may vary within the scope of the claims.

The invention claimed is:

1. An arrangement for controlling unloading of a forestry machine, the forestry machine comprising:
   a load space for timber load,
   a boom structure,
   a wood-handling tool attached to said boom structure,
   a control system and a measuring apparatus of the forestry machine,
      wherein said measuring apparatus is arranged to measure a position of the forestry machine and a rotation angle of the boom structure, and a position of single boom parts of the boom structure and a position of the wood-handling tool, and
      wherein said control system is arranged:
      to define and note down a location of a timber pile,
      to calculate and note down a position of an edge of the timber pile,
      to control the wood-handling tool to pick a timber bundle from the timber load,
      to allow a driver and/or the control system to justify the timber bundle against a load screen,
      to calculate a distance of an end justified to a load screen of said timber bundle from the wood-handling tool,
      to calculate an unloading place for said timber bundle in the location of timber pile defined for the timber pile, and
      to control and unload said timber bundle in said calculated unloading place in the timber pile with said control system, and said measuring apparatus of the forestry machine such that one edge of the timber pile becomes even and straight.

2. The arrangement according to claim 1, wherein said measuring apparatus is arranged to measure a motion space of the single boom parts of the boom structure.

3. The arrangement according to claim 1, wherein said measuring apparatus is arranged to measure a rotation angle of the wood-handling tool.

4. The arrangement according to claim 1, wherein said control system is arranged to control the rotation angle of said boom structure and the position of single boom parts of the boom structure and a location of said wood-handling tool.

5. The arrangement according to claim 1, wherein said measuring apparatus is arranged to measure a position of the grabbing means of the wood-handling tool.

6. The arrangement according to claim 5, wherein said measuring apparatus is arranged to identify and/or control the position of the grabbing means of the wood-handling tool.

7. The arrangement according to claim 1, wherein said control system is arranged to calculate a height of the timber pile based on the unloading place of unloaded timber bundles.

8. The arrangement according to claim 1, wherein said control system is arranged to automatically identify a location of the forestry machine and/or the location of the timber pile.

9. The arrangement according to claim 1, wherein said control system is arranged to automatically identify a position of the boom structure of the forestry machine and/or its rotation angle by identifying the position and/or motion space of single boom parts.

10. The arrangement according to claim 1, wherein said forestry machine is a forwarder.

11. A method for controlling unloading of a forestry machine, wherein the forestry machine comprises a load space for a timber load, a boom structure, a wood-handling tool attached to said boom structure, a control system, and a measuring apparatus, the method comprising:

defining and noting down, a location of a timber pile, calculating and noting down a position of an edge of the timber pile, picking, by the wood-handling tool, a timber bundle from the timber load, allowing a driver and/or the control system to justify the timber bundle against a load screen, calculating a distance of an end justified to the load screen of said timber bundle from the wood-handling tool, calculating an unloading place for said timber bundle in the location of timber pile defined for the timber pile, and controlling and unloading said timber bundle in said calculated unloading place in the timber pile with said control system and said measuring apparatus of the forestry machine such that one edge of the timber pile becomes even and straight.

12. The method according to claim 11, wherein the location of the timber pile is noted down, by picking the timber bundle from the timber load of said load space and by transferring and unloading said timber bundle on the one edge of the timber pile.

13. The method according to claim 11, wherein the location of the timber pile is noted down, by picking a first timber bundle from the timber load of said load space and by transferring and unloading said first timber bundle on the one edge of the timber pile and by picking a second timber bundle from the timber load of said load space and by transferring and unloading said second timber bundle on another edge of the timber-pile location.

14. The method according to claim 11, further comprising controlling the wood-handling tool against the load screen and registering a location of said load screen.

15. The method according to claim 11, wherein said forestry machine is a forwarder.

* * * * *